US011335477B2

(12) United States Patent
Cristofani et al.

(10) Patent No.: US 11,335,477 B2
(45) Date of Patent: May 17, 2022

(54) HIGH VOLTAGE POWER CABLE WITH FATIGUE-RESISTANT WATER BARRIER

(71) Applicant: Prysmian S.p.A., Milan (IT)

(72) Inventors: Fabrizio Cristofani, Milan (IT); Paolo Liboi, Milan (IT); Silvio Frigerio, Milan (IT); Giovanni Pozzati, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 17/056,611

(22) PCT Filed: May 25, 2018

(86) PCT No.: PCT/EP2018/063768
§ 371 (c)(1),
(2) Date: Nov. 18, 2020

(87) PCT Pub. No.: WO2019/223878
PCT Pub. Date: Nov. 28, 2019

(65) Prior Publication Data
US 2021/0210253 A1 Jul. 8, 2021

(51) Int. Cl.
*H01B 7/02* (2006.01)
*H01B 7/282* (2006.01)
(52) U.S. Cl.
CPC .................. *H01B 7/2825* (2013.01)
(58) Field of Classification Search
CPC ... H01B 7/02; H01B 7/04; H01B 7/06; H01B 7/10; H01B 7/12; H01B 7/2825
USPC .............................. 174/102 R, 103, 108, 109
See application file for complete search history.

(56) References Cited

U.S. PATENT DOCUMENTS

| | | | | |
|---|---|---|---|---|
| 3,394,450 | A | * 7/1968 | Gill | B21C 37/09 29/430 |
| 3,575,748 | A | * 4/1971 | Polizzano | H01B 13/266 156/54 |
| 3,681,515 | A |   8/1972 | Mildner | |
| 4,472,597 | A | * 9/1984 | Uematsu | H01B 7/2825 174/106 SC |
| 4,725,693 | A | * 2/1988 | Hirsch | B32B 15/08 174/107 |
| 5,043,538 | A | * 8/1991 | Hughey, Jr | H01B 7/2825 174/107 |

(Continued)

FOREIGN PATENT DOCUMENTS

| | | | | | |
|---|---|---|---|---|---|
| JP | 2001-006446 | A | * 1/2001 | | 7/17 |
| JP | 2014-149977 | A | * 8/2014 | | 7/28 |

OTHER PUBLICATIONS

International Search Report form the European Patent Office in corresponding International Application No. PCT/EP2018/063768, dated Apr. 4, 2019.

(Continued)

*Primary Examiner* — William H. Mayo, III
(74) *Attorney, Agent, or Firm* — Finnegan, Henderson, Farabow, Garrett & Dunner, L.L.P.

(57) ABSTRACT

A power cable has an insulated conductor; a copper water barrier, in form of a tube with a welding line, surrounding each insulated conductor; and a polymeric sheath surrounding each copper water barrier. The copper water barrier has a thickness and the polymeric sheath has a thickness such that a ratio between the thickness of the copper water barrier and the thickness of the polymeric sheath is 0.15 at most.

9 Claims, 1 Drawing Sheet

(56) References Cited

U.S. PATENT DOCUMENTS

| | | | | |
|---|---|---|---|---|
| 5,191,173 | A * | 3/1993 | Sizer | E21B 17/206 |
| | | | | 174/102 R |
| 9,058,917 | B2 * | 6/2015 | Koelblin | H01B 7/045 |
| 2011/0048765 | A1 * | 3/2011 | Eggertsen | H01B 7/045 |
| | | | | 174/107 |
| 2014/0060884 | A1 | 3/2014 | Patel | |
| 2016/0141076 | A1 * | 5/2016 | Perego | H01B 13/2613 |
| | | | | 427/455 |
| 2018/0202242 | A1 * | 7/2018 | O'Grady | E21B 17/206 |

OTHER PUBLICATIONS

Written Opinion of the International Searching Authority from the European Patent Office in corresponding International Application No. PCT/EP2018/063768, dated Apr. 4, 2019.

* cited by examiner

HIGH VOLTAGE POWER CABLE WITH FATIGUE-RESISTANT WATER BARRIER

This application is a national phase application based on PCT/EP2018/063768, filed May 25, 2018, the content of which is incorporated herein by reference.

BACKGROUND

Technical Field

The present disclosure generally relates to power cables, particularly (although not limitedly) to high voltage (HV) power cables, even more particularly (but not limitedly) to high voltage power cables for underwater or underground deployment.

Overview of the Related Art

Power cables, particularly high voltage power cables, typically comprise one or more insulated conductors (one insulated conductor for single-phase power transmission, three insulated conductors for 3-phase power transmission). Cables with a single insulated conductor are also referred to as "single-core" cables, while cables with more than one insulated conductor are also referred to as "multi-core" cables; for example, cables with three insulated conductors are referred to as "3-core" cables. With "insulated conductor" it is meant an electrical conductor surrounded by an insulating system comprising, an inner semiconducting layer surrounding the conductor, an insulating layer surrounding the inner semiconducting layer, and an outer semiconducting layer surrounding the insulating layer. A metal screen can be provided to surround each insulated conductor or all the insulated conductors collectively. An armour, for example of metal wires or metal tapes, can be provided to surround each insulated conductor or the insulated conductors for providing resistance to tensile stress.

When a power cable is to be installed in a wet or potentially wet environment, such as underground or underwater, the insulated conductor(s) of the cable should be protected from humidity or water penetration that may lead to electrical breakdown. For this purpose, power cables for underwater or underground deployment typically include a moisture/water barrier, which can be provided around each insulated conductor and/or around the bundle of insulated conductors for preventing or at least reducing the water ingress in and/or propagation along the cable.

The moisture/water barrier, in the following referred to as "water barrier" for conciseness, can also have a function of resisting to mechanical stresses, during production, installation and use of the cable.

The water barrier is typically made of metal, particularly it can be made of aluminum, lead or copper. Copper is regarded as preferable, being lighter than lead and being less prone to corrosion.

The water barrier can be in form of a longitudinally folded sheet with overlapped and glued edges or welded edges. A copper or aluminum water barrier in form of a longitudinally folded sheet, compared to an extruded lead water barrier, decreases the cable weight and diameter, improves the cable pulling resistance and achieves longer delivery lengths, which, in turn, allows reducing the number of joints in a link. All this has a significant impact on cost reduction of the system where the power cable is used.

The metallic sheet forming the water barrier can have a smooth or corrugated surface, depending, for example, on the cable intended use. In particular, the power cable can be deployed as a static cable, which is laid on a surface like the sea bed between fixing points, or as a dynamic cable, which has at least a section vertically submerged, thereby being potentially exposed to motions of the sea water, like sea/ocean currents and/or wind-induced motions. In this latter case, a water barrier having a corrugated surface guarantees enough flexibility to the cable compared to a water barrier having a smooth surface.

The water barrier is generally covered by a polymeric, optionally semi-conductive (depending on the applications) sheath. The sheath protects the water barrier and, if semi-conductive, also provides voltage equalization.

U.S. Pat. No. 9,058,917 relates to a submarine electric power cable comprising an electrical conductor surrounded by an insulation, said insulation being surrounded by a metallic moisture barrier, a semi-conductive adhesive layer surrounding said metallic moisture barrier, and a semi-conductive polymeric jacket surrounding said semi-conductive adhesive layer. The metallic moisture barrier is formed from copper. The design of the metallic moisture barrier is a welded tube. In an embodiment, a copper tube with a thickness of 0.8 mm is used and the jacket of a semi-conductive polyethylene material has a thickness of 5 mm.

U.S. Pat. No. 4,256,921 relates to underground cables for the transmission and distribution of electrical power. The cable includes a conventional polyolefin insulated cable core which is surrounded by a composite jacket. The composite jacket comprises metallic moisture barrier which is sandwiched between an inner part and an outer part of the jacket. The moisture barrier may be formed of a sheet of copper having a thickness sufficient to meet fatigue resistance requirements. Layers of adhesive plastic material are applied to at least one side of this sheet of metal. The adhesive layer/s may be comprised of a carbon black particle. The inner and/or the outer part may be made of a semiconductor.

WO 2017/036506 relates to high voltage electric power transmission cables comprising a moisture barrier surrounding the insulation system. The moisture barrier comprises a first layer and a second layer. The first layer is an extruded plastic material layer in direct contact with the insulation system. The second layer is a metallic material layer, such as copper, in contact with the first layer. The first layer comprises a lipophobic polymer and is semi-conducting. The second layer may be a welded metallic layer that is corrugated or non-corrugated.

SUMMARY OF THE SOLUTION ACCORDING TO THE PRESENT DISCLOSURE

The Applicant has observed that known power cables have water barriers which do not ensure a sufficient resistance to fatigue and bending.

The Applicant has observed that there is the need of improving the fatigue strength of the water barrier, particularly copper made in form of a folded foil with welded edges, both for static and dynamic high voltage power cable. In particular, in case of water barrier in form of a welded tube improvement of bending resistance is sought to avoid welding impairment.

The Applicant has tackled the problem of devising a power cable, particularly for high voltage power transmission and even more particularly for underwater or underground deployment, having a water barrier which is more resistant to fatigue and bending.

The Applicant has found that the sheath surrounding a water barrier could not provide the water barrier with a suitable mechanical protection, on the contrary, the sheath could damage the water barrier which can wrinkle, especially when cable bends.

The Applicant has found a solution in the design of a power cable that ensures the water barrier with desired resistance to fatigue and bending, thus preventing any moisture/water penetration in the cable.

According to the present disclosure, a power cable is provided, comprising a copper made water barrier in form of welded tube surrounding each insulated conductor and a polymeric, optionally semiconductive, sheath surrounding the water barrier, wherein the thickness of the copper barrier is reduced with respect to that of the sheath. In particular, the ratio between copper barrier thickness and sheath thickness is equal to or lower than 0.15.

Such a reduction of the copper water barrier thickness allows the sheath to better protect the metal layer which, in turn, maintains its water barrier properties and fatigue and bending resistance.

The present disclosure relates to a power cable comprising an insulated conductor; a copper water barrier in form of a tube with a welding line surrounding each insulated conductor, and a polymeric sheath surrounding each copper water barrier. The water barrier has a thickness and the polymeric sheath has a thickness such that a ratio between the thickness of the copper water barrier and the thickness of the polymeric sheath is 0.15 at most.

In an embodiment of the cable of the disclosure, the thickness of the copper water barrier and the thickness of the polymeric sheath are such that a ratio between the thickness of the water barrier and the thickness of the polymeric sheath is 0.12 at most.

The thickness of the copper water barrier can be in the range from 0.2 mm to 1.0 mm.

The thickness of the polymeric sheath can be in the range from 3 mm to 7 mm, for example in the range from 4 mm to 6 mm.

In an embodiment of the cable of the disclosure, an adhesive layer, is interposed between and in direct contact with the copper water barrier and sheath.

In an embodiment of the cable of the disclosure, the adhesive layer and the polymeric sheath are semiconductive layers.

In another embodiment of the cable of the disclosure, a cushion layer can be provided in radial internal position and in direct contact to the copper water barrier.

In an embodiment of the cable of the disclosure, the cushion layer is made of hygroscopic and semiconductive material.

In an embodiment of the cable of the disclosure, the cushion layer comprises at least one copper layer.

In the present description and claims as "high voltage" it is meant an electric voltage of from about 30 KV to 300 KV or more.

For the purpose of the present description and of the appended claims, except where otherwise indicated, all numbers expressing amounts, quantities, percentages, and so forth, are to be understood as being modified in all instances by the term "about". Also, all ranges include any combination of the maximum and minimum points disclosed and include any intermediate ranges therein, which may or may not be specifically enumerated herein.

For the purpose of the present description and of the appended claims, the words "a" or "an" should be read to include one or at least one and the singular also includes the plural unless it is obvious that it is meant otherwise. This is done merely for convenience and to give a general sense of the invention.

BRIEF DESCRIPTION OF THE DRAWINGS

These and other features and advantages of the solution according to the present disclosure will be appear more clearly by reading the following detailed description of embodiments thereof, provided merely as non-limitative examples making reference to the attached drawings, wherein.

DETAILED DESCRIPTION OF EXEMPLARY EMBODIMENTS

Figure 1:
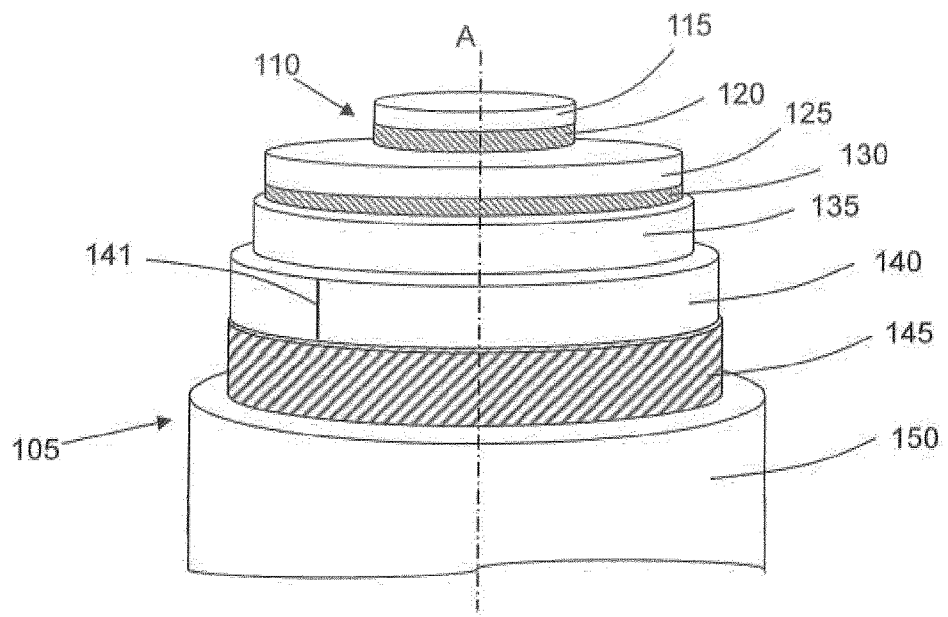
FIG. 1 schematically shows in perspective a single-core power cable according to an embodiment of the present disclosure.

FIG. 1 schematically shows in perspective a single-core power cable 105 according to an embodiment of the present disclosure.

The cable 105 comprises, in radial succession from a central axis A thereof towards the periphery, an insulated conductor 110 comprising an electric conductor 115, an inner semiconductive layer 120, an insulating layer 125 and an outer semiconductive layer 130.

A cushion layer 135 can be provided around the insulated conductor 110. The cushion layer 135 can be made of hygroscopic and semiconductive material. The cushion layer 135 can be a sandwich of layers, as described in greater detail shortly hereafter.

The insulated conductor 110 is surrounded by a copper water barrier 140. In the present embodiment, a cushion layer 135 is present. When the cushion layer 135 is present, the water barrier 140 is in direct contact with the cushion layer 135.

The cushion layer 135 can be in form of one or more hygroscopic semiconductive tape layers, helically or longitudinally wound around the insulated conductor 110, with or without overlap. Each of said tapes can have a thickness of from about 1.0 mm to about 2.0 mm. In addition, the cushion layer 135 can include one or more copper layers, e.g. in laminated shape or as single- or multi-wire, arranged helicoidally, and/or a single-wire or a multi-wire of polypropylene, arranged helicoidally. Hygroscopic semiconductive tape/s and optional copper layer/s can be radially alternated.

The cushion layer 135, comprising hygroscopic semiconductive tape/s and, optionally, copper layer/s, provides a cushioning action between the insulated conductor 110 and the water barrier 140. The cushion layer 135 acts as a water-blocking system for preventing longitudinal water penetration and as a mechanical shock absorber under the copper water barrier 140, capable of absorbing impact forces and of preventing the underlying layers, particularly the semi-conductive outer screen 130 of the insulated conductor 110, from being damaged. The copper layer/s of the cushion layer 135 can improve the electrical contact between the copper water barrier 140 and the semiconductive outer screen 130 of the insulated conductor 110. In this way, possible partial electric discharges can be prevented.

The thickness of the cushion layer 135 allows thermal radial expansion of the insulated conductor 110 due to thermal cycles, without exercising a potentially damaging stress on the copper water barrier 140, particularly along the weld line between the edges of the copper sheet.

The copper water barrier 140 can be in form of a longitudinally folded copper sheet, with a welding line 141 where the sheet edges contact. The copper sheet can have a smooth or corrugated surface, also depending on the cable application (static or dynamic cable, as explained in the foregoing). The copper water barrier 140 can also perform as a screen for cable 105.

The copper employed for the water barrier 140 according to the present disclosure can be a copper with electrical conductivity of at least 85% IACS (International Annealed Copper Standard), for example of at least 95% IACS. A suitable copper for the water barrier should be a high purity one with a copper content greater than 90% and a low oxygen content, for example of 50 ppm at most, for example lower than 15 ppm.

Around the copper water barrier 140, an adhesive layer 145 is provided, and the cable 105 is protected by a sheath 150. In the present embodiment, the adhesive layer 145 and the sheath 150 are not semi-conductive.

The adhesive layer 145 can have a thickness in the range from about 0.1 mm to about 0.3 mm. This layer enhances a tight bond between the water barrier 140 and the sheath 150 while providing a suitable peel strength value. The peel strength value provides an indication of the adhesion of the sheath 150 to the copper water barrier 140, and can be measured by a peel test, as prescribed by the standard IEC 60840 Annex G (2004). The standard prescribes that the minimum peel strength test value shall not be less than 0.5 N/mm.

The Applicant has found that an adhesive layer 145 thicker than about 0.3 mm might can induce, by virtue of its modulus different from the modulus of the sheath 150, a relative movement between the copper water barrier 140 and the sheath 150. This could cause wrinkles to the copper water barrier 140, especially when the cable is bent.

In embodiments, the sheath 150 can have thickness of from 3 and 7 mm, for example of from 4 to 6 mm. The copper water barrier 140 can have a thickness selected in the range from about 0.2 mm and about 1.0 mm, also depending on the thickness of the sheath 150, so to achieve a ratio between the thickness of the water barrier copper 140 and the thickness of the sheath 150 less than or equal to 0.15, preferably less than or equal to 0.12.

The sheath 150 can be the outermost layer of the power cable 105. In an alternative embodiment, the sheath 150 can be surrounded by an armour, by optional protecting layer/s interposed between sheath 150 and the armour, and by servings surrounding the armour, as it will be better explained in connection with the cable of FIG. 2.

A suitable process for manufacturing the power cable 105 will now be described.

Starting from an insulated conductor 110 as depicted in FIG. 1, optionally surrounded by a cushion layer 135 (manufacturing process steps up to the formation of the insulated conductor 110 and of the optional cushion layer 135 are not described, being known per-se), a copper foil or copper sheet, for example with a width of 280 mm and a thickness of 0.5 mm, is caused to pass through a set of straightening rolls to straighten and apply the proper tension to the strip.

The copper sheet is then centered using a centering unit and an edge slit to achieve an alignment of edges and width as precise as possible.

Then, using forming tools comprising, e.g., successive sets of forming rolls or dies, the copper sheet is folded on itself to form a longitudinally opened tube surrounding the insulated conductor 110 and the cushion layer 135.

The longitudinally opened tube is closed by welding, using a welding unit, for example a Tungsten Inert Gas (TIG) welding unit. The welding can be done using shielding gas, such as Argon or Helium or a mixture thereof, both from in and outside the tube to avoid oxidation of the weld seam.

The obtained copper tube is a longitudinally welded copper tube with a welding line and forms the copper water barrier 140.

A belt caterpillar pulls the welded copper tube through reduction dies or a set of down-sizing rollers or a mixed solution that includes reduction dies and reduction rollers ("reduction group"), able to reduce the diameter of the welded copper tube. The external diameter of the welded copper tube is thus reduced by, for example, about 10 mm through the reduction group. Before entering a co-extruder, the welded copper tube surface is heated by an inductor or by hot air blowers to enhance adhesion with the adhesive layer to be applied subsequently. The welded copper tube is heated to at least 100° C. by said inductor or air blowers. Hence, the welded copper tube achieves a suitable adhesion with the non-conductive adhesive layer to be applied subsequently. The welded copper tube then passes through a co-extruder to be covered by a thin film of the (extruded) adhesive layer 145 and by the polymeric sheath 150.

The co-extruder head is connected to a vacuum pump in order to guarantee a suitable bonding of the polymeric sheath onto copper tube without using too much pressure.

The cable is then passed through a cooling trough. Before entering inside the cooling trough, there can be one or several trickles. Their main function is to cool down the polymeric sheath. In an embodiment, gradual cooling is applied using hot water in the first meters of the cooling trough and then cold water in the remaining of the cooling trough.

Figure 2:
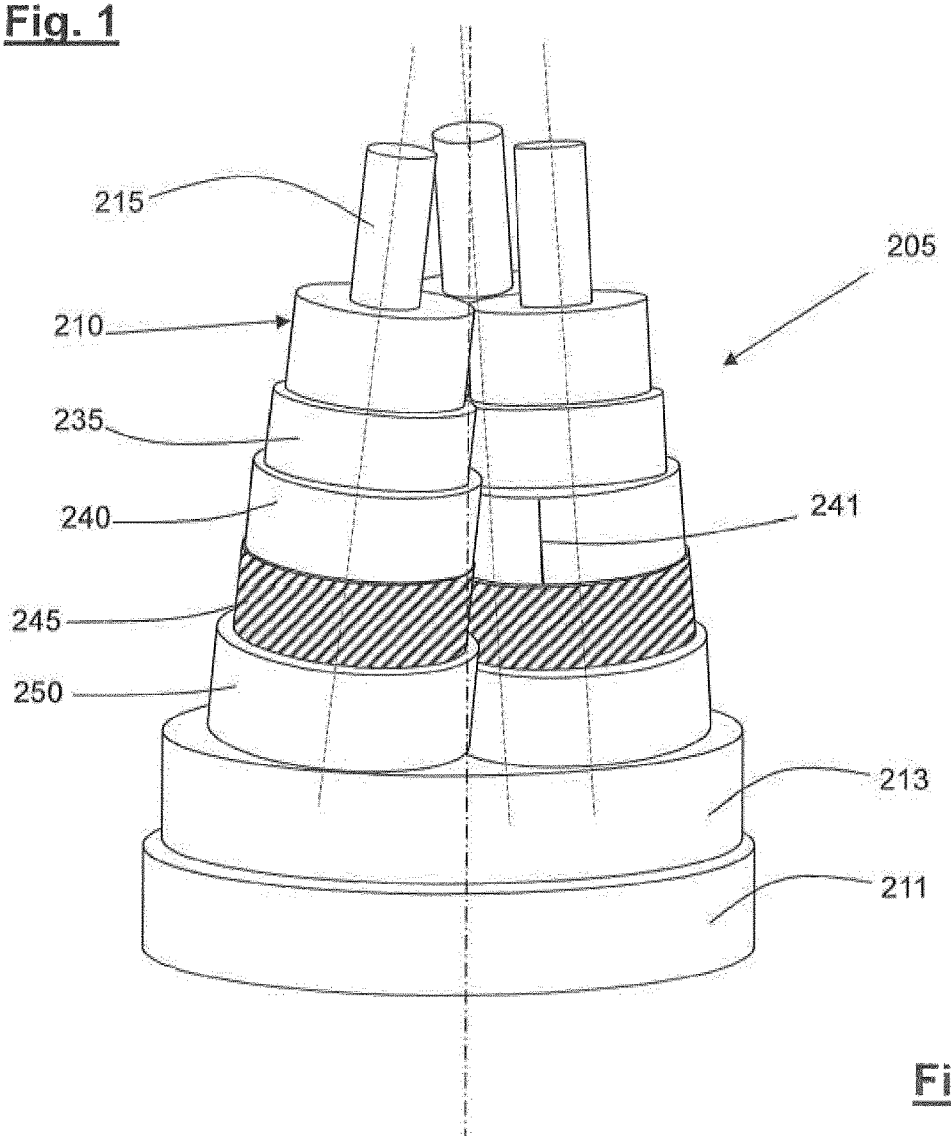
FIG. 2 schematically shows in perspective a 3-core power cable according to an embodiment of the present disclosure.

FIG. 2 schematically shows in perspective a 3-core power cable 205 according to an embodiment of the solution according to the present disclosure.

The cable 205 comprises three cores, each comprising an electric conductor 215.

Each electric conductor 215 is surrounded by an insulating system 210 comprising an inner semiconductive layer, an insulating layer and an outer semiconductive layer, the insulating system being surrounded by a cushion layer 235 and by a copper water barrier 240.

The cushion layer 235 can have substantially the same features of the cushion layer 135 of FIG. 1.

The cushion layer 235 is an optional feature. When the cushion layer 235 is present, the copper water barrier 240 is in direct contact with the cushion layer 235. The copper water barrier 240 can have substantially the same features of the water barrier 140 of FIG. 1, comprising the welding line 241.

Around each copper water barrier 240, an adhesive layer 245 and a sheath 250 are provided. The adhesive layer 245 and the sheath 250 can be semiconductive or not, depending on the overall power cable line configuration.

The adhesive layer 245 and the sheath 250 can have substantially the same features of, respectively, the adhesive layer 145 and the sheath 150 of FIG. 1.

A bedding 213 surrounds the three cores. The bedding can be made of extruded polymeric filler (for example in rubber or polypropylene), of polymeric rods or tubes, or can comprise three shaped (substantially triangular) inserts. Its main function is to obtain a cylindrical structure.

A protecting system 211, can be provided to surround the bedding. The protecting system 211 can comprise one or more helically wound polyester tape, one or more armour layer made of helically wound wires (metallic or aramidic or both) and outer serving/s, in form of extruded polymeric layer or wound yarn layer.

The invention claimed is:

1. A power cable comprising an insulated conductor; a copper water barrier, in form of a tube with a welding line, surrounding each insulated conductor; and a polymeric sheath surrounding each copper water barrier, wherein the copper water barrier has a thickness and the polymeric sheath has a thickness such that a ratio between the thickness of the copper water barrier and the thickness of the polymeric sheath is 0.12 at most.

2. The power cable of claim 1, wherein the thickness of the copper water barrier is in the range from 0.2 mm to 1.0 mm.

3. The power cable of claim 1, wherein the thickness of the polymeric sheath is in the range from 3 mm to 7 mm.

4. The power cable of claim 2, wherein the thickness of the polymeric sheath is in the range from 4 mm to 6 mm.

5. The power cable of claim 1, comprising an adhesive layer interposed between the copper water barrier and the polymeric sheath.

6. The power cable of claim 5, wherein the adhesive layer and the polymeric sheath are semiconductive layers.

7. The power cable of claim 1, comprising a cushion layer provided in radial internal position with respect to the copper water barrier and in direct contact thereto.

8. The power cable of claim 7, wherein the cushion layer is made of hygroscopic and semiconductive material.

9. The power cable of claim 7, wherein the cushion layer comprises at least one copper layer.

* * * * *